(12) United States Patent
Foster

(10) Patent No.: US 9,733,887 B2
(45) Date of Patent: Aug. 15, 2017

(54) WIRELESS TRANSFER DEVICE AND METHODS

(71) Applicant: Wise Balls, LLC, Severna Park, MD (US)

(72) Inventor: Nicholas Foster, Severna Park, MD (US)

(73) Assignee: Wise Balls, LLC, Severna Park, MD (US)

( * ) Notice: Subject to any disclaimer, the term of this patent is extended or adjusted under 35 U.S.C. 154(b) by 0 days.

(21) Appl. No.: 13/897,245

(22) Filed: May 17, 2013

(65) Prior Publication Data

US 2013/0307770 A1    Nov. 21, 2013

Related U.S. Application Data

(60) Provisional application No. 61/649,252, filed on May 19, 2012.

(51) Int. Cl.
*G06F 3/14* (2006.01)
*H04L 29/08* (2006.01)
*H04W 4/00* (2009.01)

(52) U.S. Cl.
CPC ............ *G06F 3/1454* (2013.01); *H04L 67/06* (2013.01); *H04L 67/10* (2013.01); *H04W 4/006* (2013.01)

(58) Field of Classification Search
CPC .... G06F 3/03543; G06F 3/0383; G06F 3/038; G06F 2203/0337; G06F 2203/0384; G06F 2203/0333; G06F 3/0482; G06F 3/04883; G06F 3/1454; H04M 2250/64; H04L 67/06; H04L 67/10; H04W 4/006
USPC ................ 345/156–174; 709/203, 227–229; 715/810
See application file for complete search history.

(56) References Cited

U.S. PATENT DOCUMENTS

| | | | | |
|---|---|---|---|---|
| 7,808,484 B1* | 10/2010 | Bareli | ........................ | 345/163 |
| 8,245,923 B1* | 8/2012 | Merrill et al. | ............... | 235/380 |
| 2006/0007151 A1* | 1/2006 | Ram | ........................... | 345/163 |
| 2008/0082671 A1* | 4/2008 | Meijer et al. | ................ | 709/228 |
| 2008/0114747 A1* | 5/2008 | Goller et al. | .................... | 707/5 |
| 2009/0244015 A1* | 10/2009 | Sengupta et al. | ............. | 345/173 |
| 2010/0138743 A1* | 6/2010 | Chou | ................... | G06F 3/0486 715/702 |
| 2011/0083111 A1* | 4/2011 | Forutanpour et al. | ........ | 715/863 |
| 2011/0154014 A1* | 6/2011 | Thorn | .......................... | 713/150 |
| 2011/0265035 A1* | 10/2011 | Lepage et al. | ............... | 715/810 |
| 2013/0051755 A1* | 2/2013 | Brown et al. | ................. | 386/241 |

* cited by examiner

*Primary Examiner* — Alexander Eisen
*Assistant Examiner* — Abhishek Sarma
(74) *Attorney, Agent, or Firm* — Caesar Rivise, PC

(57) ABSTRACT

A wireless transfer system includes a wireless transfer device having a wireless module, microprocessors for executing transfer protocols, a motion sensing module, and an infrared sensor; a central server; and one or more display devices, the wireless transfer device, and the central server being connected though one or more networks, the one or more networks comprising at least one of wireless communications networks and wired communications networks.

17 Claims, 7 Drawing Sheets

WIRELESS TRANSFER DEVICE AND METHODS

PRIORITY INFORMATION

This application claims priority from U.S. Provisional Patent Application Ser. No. 61/649,252, filed May 19, 2012, the entire disclosure of which is hereby incorporated herein by reference in its entirety.

FIELD OF DISCLOSURE

The disclosure relates to wireless mouse technology. In particular, the disclosure relates to enabling selective display of material on different devices.

BACKGROUND

There is a need for devices and methods that can enable displaying material on different devices. Further, there is a need for transferring the material from one screen (or device) to another to enable, for example, displaying material on different devices.

SUMMARY

Wireless transfers devices and methods are provided that enable display of material on multiple devices. Further transfer devices and methods enable transfer of material between multiple devices.

Additional features and advantages of the disclosed embodiments may be set forth in the description which follows, and in part may be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments may become more fully apparent from the following description and appended claims, or may be learned by the practice of the disclosed embodiments as set forth herein.

DETAILED DESCRIPTION

Various embodiments of the disclosed embodiments may be discussed in detail below. While specific implementations may be discussed, it should be understood that this be may be done for illustration purposes only. A person skilled in the relevant art may recognize that other components and configurations may be used without parting from the spirit and scope of the disclosed embodiments.

The disclosed embodiments comprise a variety of embodiments, such as a method and apparatus and other embodiments that relate to the basic concepts of the disclosed embodiments. Note that while this disclosure discusses wireless mouse technology, the disclosed embodiments by no means limited to that area and may be applied to a wide variety of environment and uses.

Figure 1:
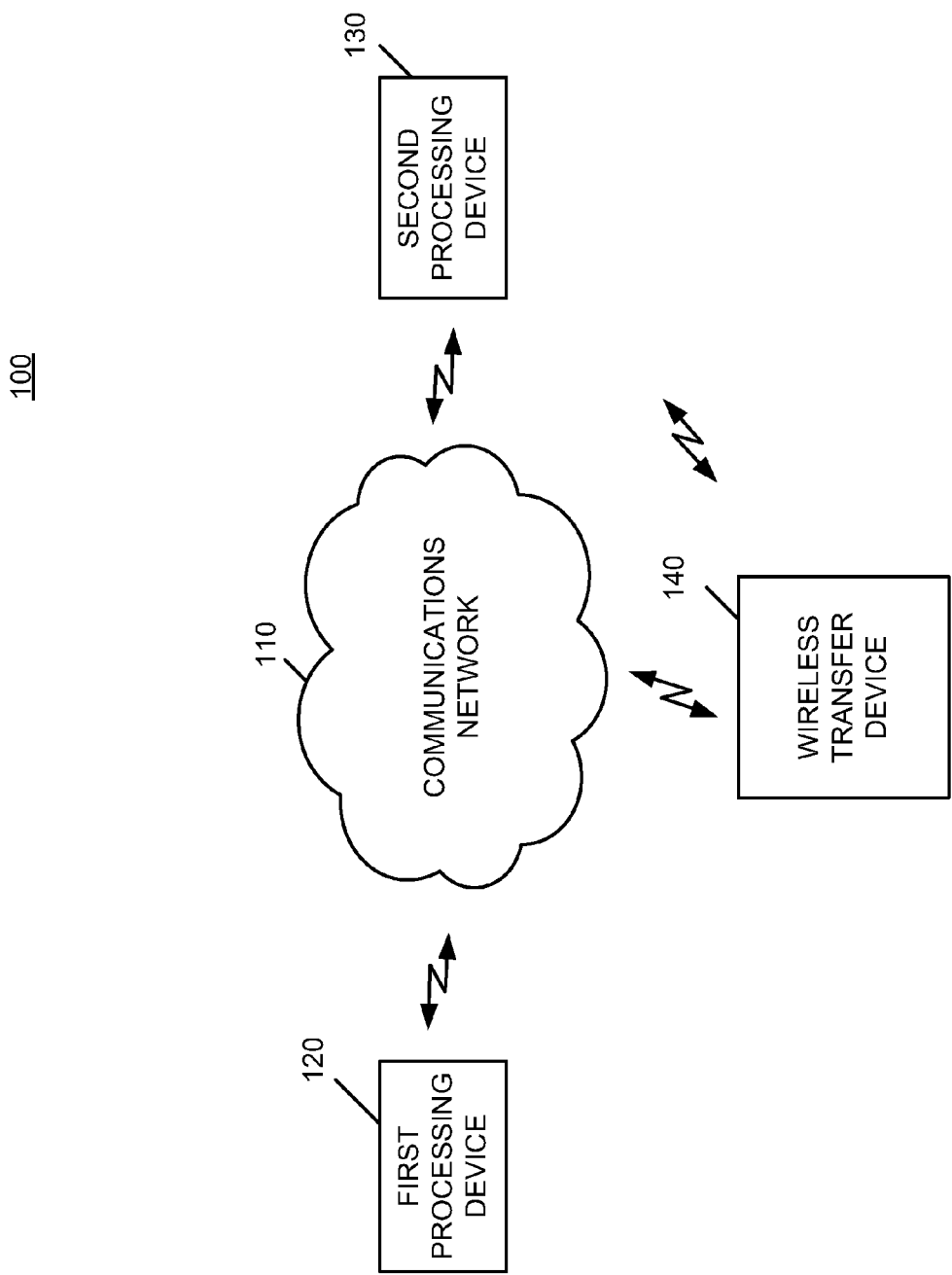
FIG. 1 shows a wireless transfer device in accordance with an embodiment.

The disclosed embodiments may concern a wireless transfer device 140 as shown in FIG. 1. The wireless transfer device 140 possible embodiments are described below in relation to FIGS. 1-7. For example, a user may wirelessly select a file via a on-screen cursor provided by the wireless transfer device 140 located on the first processing device 120, then point the wireless transfer device 140 at the screen of a second processing device 130 to wirelessly and securely transfer a desired file, screen content, etc.

The first processing device 120 and the second processing device 130 could be wirelessly connected devices including (but not limited to):

Desktop PC/Mac/Unix
Laptop PC/Mac/Unix
Tablet (Android/iOS/other)
Smart Phone (Android/iOS/other)
Smart TV (with internet browser)

The wireless transfer device 140 could have the following capabilities:

Connection to local client (the first processing device 120 or the second processing device 130) with a click and point of wireless transfer device 140

Cursor control of connected client (the first processing device 120 or the second processing device 130)

Selection of a target file on client (the first processing device 120 or the second processing device 130)

Recognition of another registered client in wireless transfer device's 140 line of sight (the first processing device 120 or the second processing device 130)

Wireless transfer of target file*

Streaming large files through wireless transfer device 140 to a desired local client (the first processing device 120 or the second processing device 130)

Save files to an online storage service (similar to DROP-BOX®)

Voice over Internet Protocol (VoIP) control of language user interface (ex. native voice commands on connected client device, ANDROID®, SIRI®, textual input, etc.)

Content broadcasting to all registered and locally present devices at once

Note that the file to be transferred may be of any format, including locally stored or internet accessible video/music.

From no connected clients to successful transfer of content to desired machine: The wireless transfer device 140 is initially "clicked" by user. The wireless transfer device 140 may send out a discovery 'ping' to identify all locally registered machines/devices. Screens of locally registered devices may flicker at assigned rate (by the wireless transfer device 140) in the infrared spectrum.

In operation, the user may point infrared detector located on the wireless transfer device 140 at the screen of the processing device they wish to connect. The wireless transfer device 140 infrared detector may recognize the flicker rate of assigned IP address (a unique IP address and flicker rate per registered device). The wireless transfer device 140 may then connect to the desired device via WIFI and the cursor may be displayed on the screen of the desired device.

The user may control the cursor via an embedded 9-axis MEMS located inside the wireless transfer device 140 and may select desired content. For example, content may be selected by way of actuating or "clicking" a button on the wireless transfer device 140. The button may be depressed for a predetermined period of time, such as 3 seconds, or 5 seconds, for example. In a preferred embodiment, the content may be selected by way of a scroll-wheel actuation. For example, the scroll-wheel may be depressed, or the scroll-wheel may be scrolled to indication selection of content or to select 'transfer.' The wireless transfer device 140 may again send out a discovery ping to all locally registered devices. Locally registered devices may flicker at assigned rate in the infrared spectrum. The user may point the infrared detector located on the wireless transfer device 140 at the screen of the device they wish to transfer the previously selected content. The wireless transfer device 140 may then connect to desired device via WIFI, transfer the selected content between the two locally registered machines, and display the cursor on the screen of that device.

With regard to analogous ANDROID®/iOS/Win8/etc. application, the wireless transfer device 140 may use the same signaling interaction described above, except that the infrared flicker may be substituted by QR Codes that are displayed on all locally registered devices. The QR Codes are unique to each IP address (just as the infrared flicker rates were in the description above) and after detection by the ANDROID®/iOS/Win8/etc. device's camera, WIFI connectivity may be initiated and a cursor is displayed on-screen of desired client. The on-screen cursor may be controlled by 9-axis motion sensing hardware found within the ANDROID®/iOS/Win8/etc. device.

Figure 2:
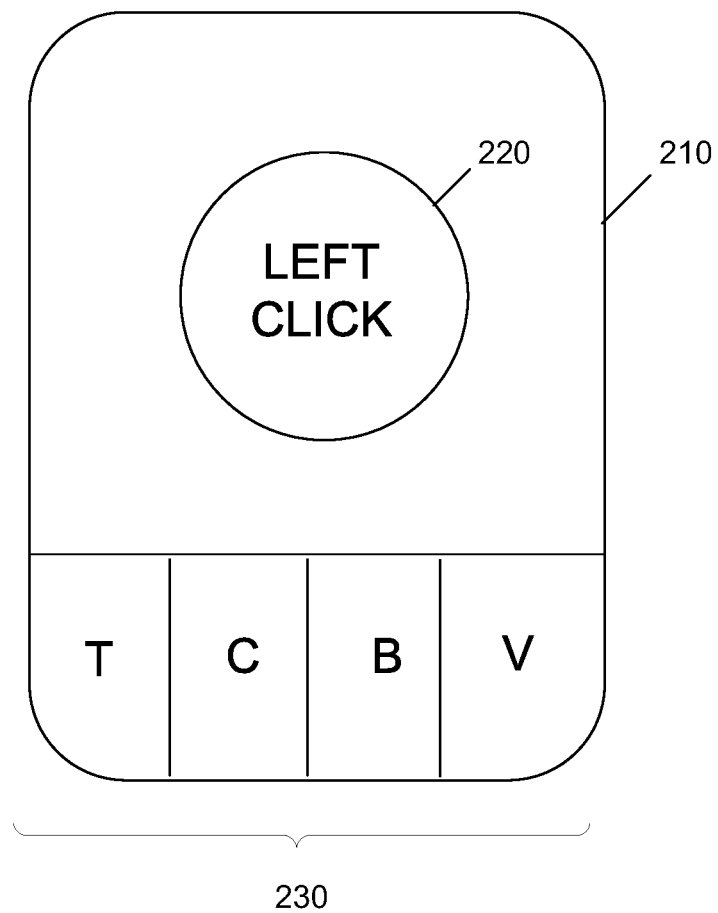
FIG. 2 shows an example of an ANDROID®/iOS/Win8/etc. device interface for a wireless transfer device in accordance with an embodiment.

FIG. 2 shows an example of an ANDROID®/iOS/Win8/etc. device interface for the wireless transfer device 140. The user's interactions with ANDROID®/iOS/Win8/etc. application may be the same as described by the flow diagrams below for the wireless transfer device 140 (left click 220 and the wireless transfer device 210 body), except that the ANDROID®/iOS/Win8/etc. device's screen displays specific buttons 230 for V=Voice Control, B=Broadcast Content, T=Transfer content to local device, and C=Save to Cloud. These on-screen buttons replace the need for the 3-second hold-click and/or clicking the scroll wheel of the wireless transfer device 140.

The wireless transfer device 140 may have a physical form similar to that of a stress-ball in its size and shape. Radius of the stress-ball shape could be between 3.3-4.5 cm with a weight ~75 grams (~100 grams w/2 AA batteries), for example. A scroll wheel may be included on the stress-ball shaped device, as well as one or two LEDs, and a microphone, for example. The wireless transfer device 140 may also be available, with a similar set of capabilities and functions, on the ANDROID®/iOS/Win8 application stores for download to any specified ANDROID®/iOS/Win8 compatible device. In this case, the ANDROID®/iOS/Win8 phone would act as the wireless transfer device 140 and would have physical properties of that specific make and model phone.

Figure 3:
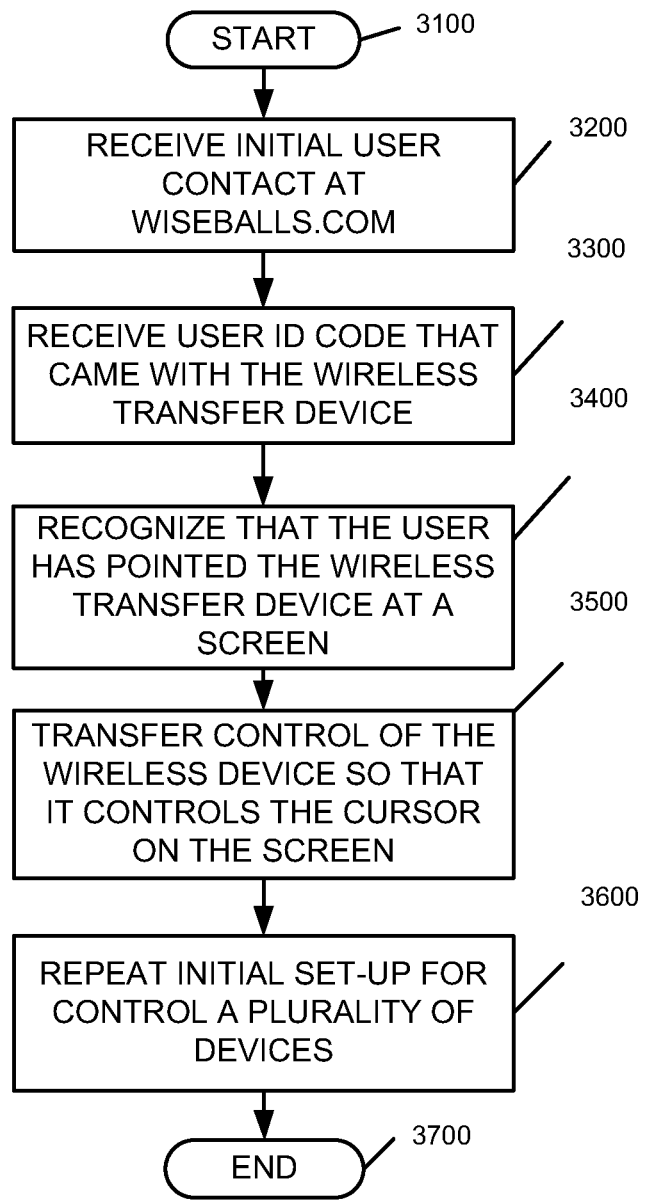
FIG. 3 shows a user interaction process for initial set-up in accordance with an embodiment.

Components of physical wireless transfer device 140 may include:
 WIFI module/microprocessor
 Embedded 9-axis MEMS spatial microprocessor
 Embedded microprocessor with client discovery, recognition, and transfer protocols, e.g., Wise Balls protocols
 Infrared detector
 Scroll wheel
 Power regulator
 Switches
 LEDs
 Plastics
 Printed circuit board
 Batteries (2 AA)
 Microphone Further embodiments and capabilities of the wireless transfer device 140 are provided below. For example, FIG. 3 is a flow diagram of the user's initial set-up interaction in accordance with methods of an embodiment. The process may be used for multiple devices. Methods in accordance with the embodiment shown in FIG. 3 begin at S3100, and proceed by receiving initial user contact at a server, for example, at Wiseballs.com, at S3200. A user identification code is received at S3300. The user identification code identifies the wireless device, and is uniquely associated with the wireless device.

The wireless transfer device may be configured to recognize that the user has pointed the wireless transfer device at a screen at S3400. The wireless device may then be caused at S3500 to have control over the display device that the wireless transfer device was recognized as pointing to at S3400. S3100-S3500 may be repeated at S3600 for control of a plurality of devices. The process may end at 3700.

Figure 4:
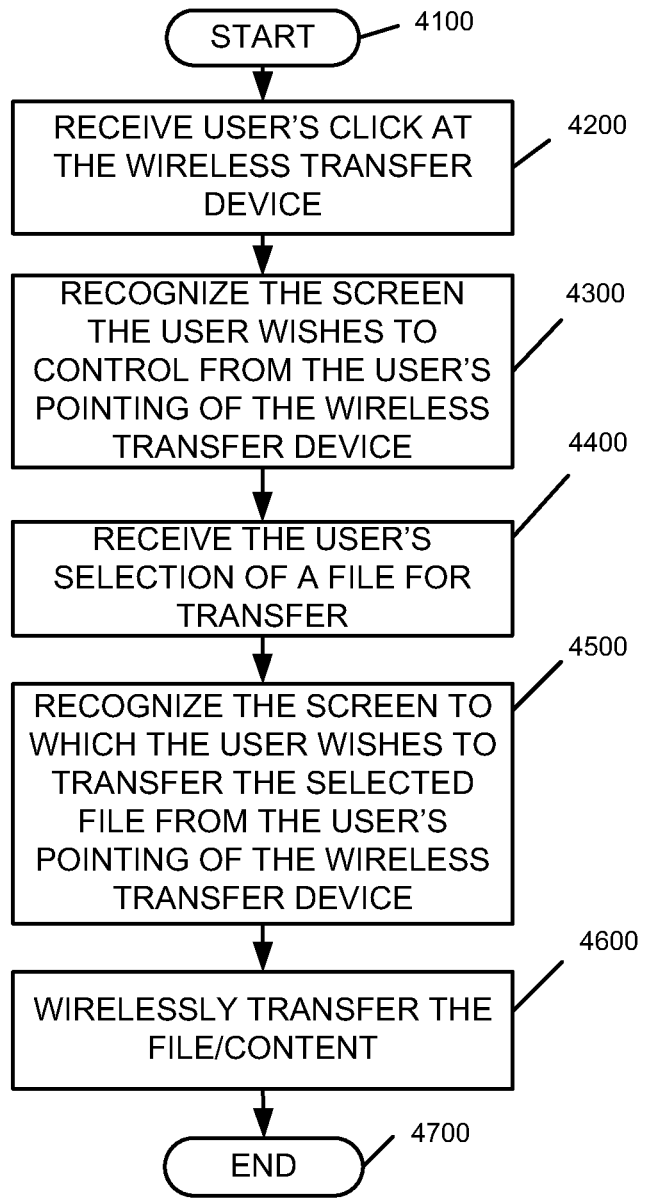
FIG. 4 shows a user interaction process for after initial set-up.

FIG. 4 is a flow diagram of the user's interaction after initial set-up in accordance with methods of an embodiment. Methods may begin at S4100, and proceed to S4200 wherein a user's clicks at a wireless transfer device are received. A screen that the user desires to control may be recognized at S4300 by the user pointing the wireless transfer device at the screen.

A user's selection of a file to be transferred may be received at S4400. For example, the user may point to a device and/or move a cursor to select a file on the display and execute a prolonged click, or execute a scroll-click to cause the file to be selected. The screen to which the user wishes to transfer the selected file from the user's pointing of the wireless transfer device may be recognized at S4500. The file may be wirelessly transferred at 4600. The process may end at 4700. In some embodiments, file transfer may occur by way of a combination of wired and wireless networks, now known or later developed.

Figure 5:
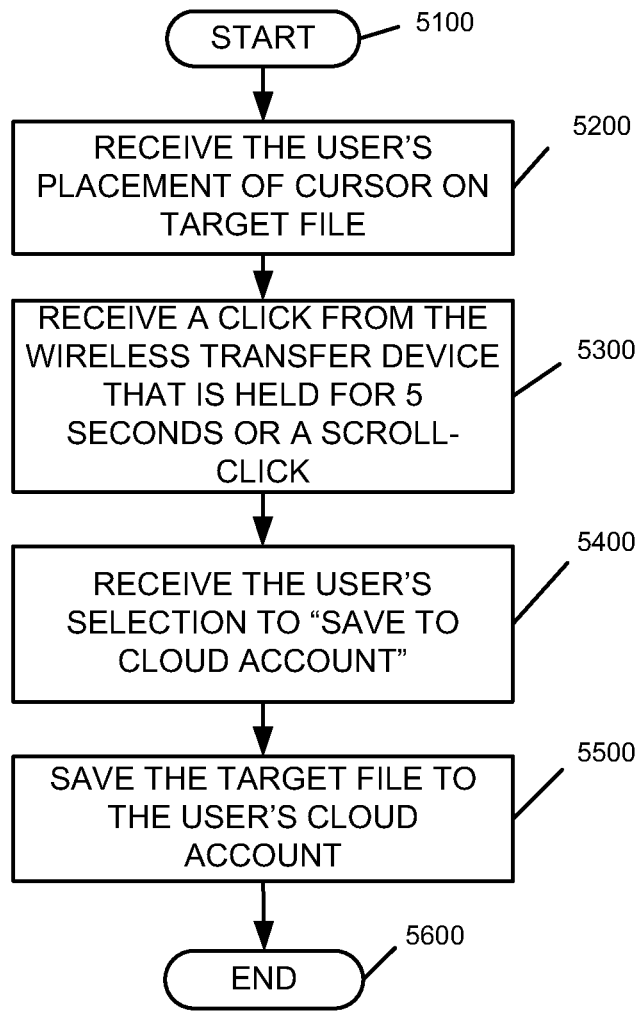
FIG. 5 shows a user interaction process for cloud storage in accordance with an embodiment.

FIG. 5 is a flow diagram of user's cloud storage interaction in accordance with methods of an embodiment. The user's client processing device (not the wireless transfer device) must have an active internet connection. Methods may begin at S5100, and proceed with receiving a user's placement of cursor on a target file at S5200. A click from the user may be received at the wireless transfer device at S5300. For example, the user may depress a button on the wireless transfer device for a period of 5 seconds, or click the scroll wheel for a list of available functions and select "cloud storage" at S5300. The user's selection may be for saving a file to a cloud or networked-connected database, such as a central server with which the wireless transfer device may communicate by way of wired and/or wireless communications networks, may be received at S5400. The file may be saved at S5500, and the process may end at S5600.

Figure 6:
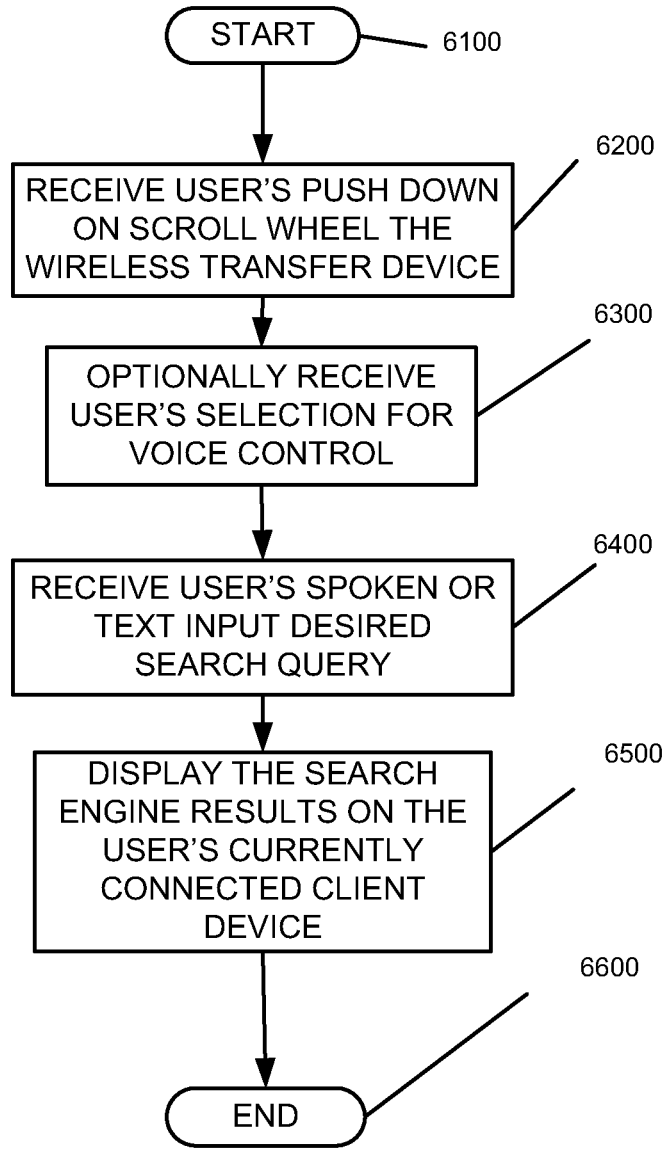
FIG. 6 shows a voice input (VoIP) process for a wireless transfer device in accordance with an embodiment.

FIG. 6 is a flow diagram of a voice command (VoIP) feature of wireless transfer device 140 in accordance with methods of an embodiment. Again, the user's client processing device (not the wireless transfer device) must have an active internet connection. Methods may begin at S6100 and proceed to S6200 wherein a user's push down on a scroll wheel of a wireless transfer device is received. Alternatively, a user's actuation of a button or other implemented input means may be received. The user may then select the "voice" feature, speak, and the speech may be transmitted by the wireless transfer device and processed by the connected client device. As such, a user's spoken desired voice command, search query, or text input, for example, may be received at S6300 in an embodiment.

A user's spoken or text input search query may be received at S6400. The connected client device's native language user interface may then display the results on the user's selected connected client device at S6500. The process may end at S6600.

Figure 7:
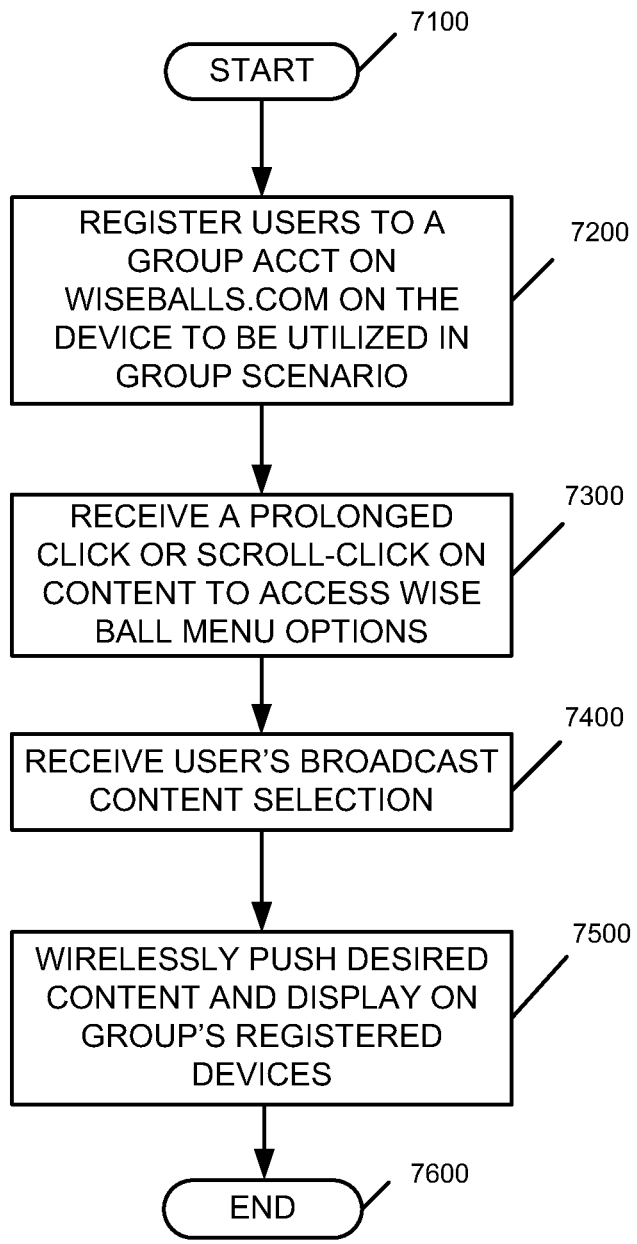
FIG. 7 shows a user interaction process for content serving/broadcasting in accordance with an embodiment.

FIG. 7 is a flow diagram of the user's interaction with content serving/broadcasting feature for use in a group setting (classroom, boardroom, office, etc.) in accordance with methods of an embodiment. For example, in a classroom setting, when using the physical wireless transfer device 140, the following interaction enables the instructor or moderator (who possesses the wireless transfer device 140) to locally broadcast selected content to physically present students.

FIG. 7 shows a process that begins at S7100, and proceeds to S7200 wherein users are registered to a group account hosted at a central server on a device to be used in a group scenario. An actuation such as a button click or, preferably a scroll wheel-click on content may be received for accessing account menu options at S7300. At 7400, a user's broadcast content selection may be received. The user may push wirelessly delivered content and display the content on a group's registered devices at S7500. The process may end at S7600.

Embodiments within the scope of the present disclosed embodiments may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information may be transferred or provided over a network or another communications connection (either hardwired, wireless, or combination thereof) to a computer, the computer properly views the connection as a computer-readable medium. Thus, any such connection may be properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed embodiments may be part of the scope of the disclosed embodiments. For example, the principles of the disclosed embodiments may be applied to each individual user where each user may individually deploy such a system. This be enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end users.

What is claimed is:

1. A wireless transfer device, comprising:
   a wireless module;
   a microprocessor configured to execute one or more transfer protocols, wherein at least one of the transfer protocols, when executed, facilitates a wireless transfer of one or more files from a central server remote from a first processing device to one or more other processing devices; and
   an infrared sensor, wherein the microprocessor is configured to recognize the infrared sensor is pointed to the first processing device, enable access to one or more files resident on the central server, receive an indication that the one or more files resident on the central server are to be transferred to the one or more other processing devices, recognize that the infrared sensor is pointed to at least one or more other processing devices, receive an indication that the one or more files resident on the central server are to be transferred to the one or more other processing devices, and facilitate the transfer of the one or more files resident on the central server directly from the central server to the one or more other processing devices, and
   the wireless transfer device being configured to enable a wireless direct transfer of the one or more files resident on the central server to the one or more other processing devices without the device storing or transmitting the one or more files resident on the central server.

2. The device of claim 1, wherein the microprocessor is a 9-axis MEMS spatial microprocessor.

3. The device of claim 1, comprising:
   a microphone, wherein the microphone configured to facilitate the wireless transfer of the one or more files resident on the central server to one or more other processing devices.

4. The device of claim 1, comprising:
   an LED.

5. The device of claim 1, comprising:
   a housing, the housing being substantially spherical, and having a radius lying in a range of about 3.3 to about 4.5 cm in radius.

6. The device of claim 5, the housing having an outer surface.

7. The device of claim 5, the housing being formed to have a substantially spherical shape.

8. The device of claim 5, the housing being formed to have a substantially spherical shape, and an outer compliant surface.

9. The device of claim 8, wherein the outer compliant material comprises rubber.

10. The device of claim 5, wherein the housing contains the wireless module and the microprocessor.

11. The device of claim 6, comprising:
a scroll wheel, the scroll wheel being configured for actuation from the outer surface of the housing.

12. The device of claim 6, comprising:
a scroll wheel, the scroll wheel being configured for actuation from a surface of the housing, the housing being substantially spherical.

13. The device of claim 1, at least one of the first processing device and the one or more other processing devices including
a display, the display displaying a device interface that indicates a user's selection selected from the group comprising: voice control, broadcast content, transfer content, and save to cloud.

14. A wireless transfer method using a wireless transfer device, comprising:
using a microprocessor located in the wireless transfer device, that is configured to:
execute one or more transfer protocols, wherein at least one of the one or more transfer protocols, when executed, facilitates a wireless transfer of one or more files from a central server remote from a first processing device to one or more other processing devices;
recognize that an infrared sensor located in the wireless transfer device is pointed to the first processing device;
enable access to one or more files resident on the central server;
receive an indication that the one or more files resident on the central server are to be transferred to the one or more other processing devices;
recognize that the infrared sensor is pointed to at least one or more other processing devices;
receive an indication that the one or more files resident on the central server are to be transferred to one or more other processing devices; and
facilitate the transfer of the one or more files resident on the central server directly to one or more other processing devices
receive a user selection of a file for transfer,
recognizing a display to which the user desires to transfer the selected file, the microprocessor recognizing that the wireless transfer device is pointing at the display, and
wirelessly facilitate the wireless file transfer directly from the one or more files resident on the central server to one or more other processing devices without the wireless transfer device storing or transmitting the one or more files resident on the central server.

15. The method of claim 14, comprising:
receiving the user's placement of a cursor on a target file;
receiving a user actuation at the wireless transfer device;
receiving the user's selection to save to a cloud account; and
saving the target file to the cloud account.

16. The method of claim 14, comprising:
receiving a user actuation at the wireless transfer device;
receiving the user's spoken input using a microphone, wherein the microphone facilitates the wireless transfer of the one or more files resident on the central server to one or more other processing devices;
recognizing the user's spoken input;
displaying results of the microprocessor's interpretation of the user's spoken input, the results being generated by a native language user interface; and
receiving an acceptance or rejection of the displayed results of the microprocessor's interpretation of the user's spoken input.

17. The method of claim 14, comprising:
registering a user to a group account hosted by a central server using the wireless transfer device;
receiving the user's indication at the wireless transfer device to select from the central server's content selections;
receiving a user's broadcast content selection; and
sending the content selection to one or more members of the group account.

* * * * *